June 23, 1970  R. A. McCARROLL  3,516,138
METHOD OF MACHINING A TWO PIECE PULLEY ASSEMBLY
Filed April 17, 1967  2 Sheets-Sheet 1
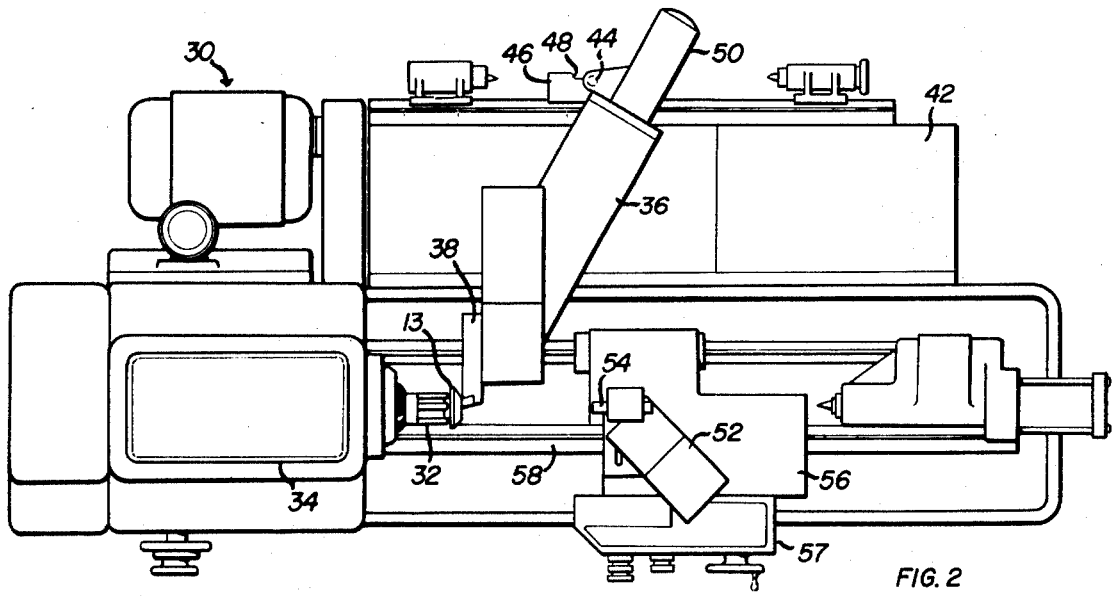
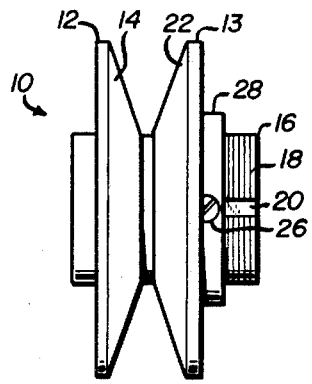
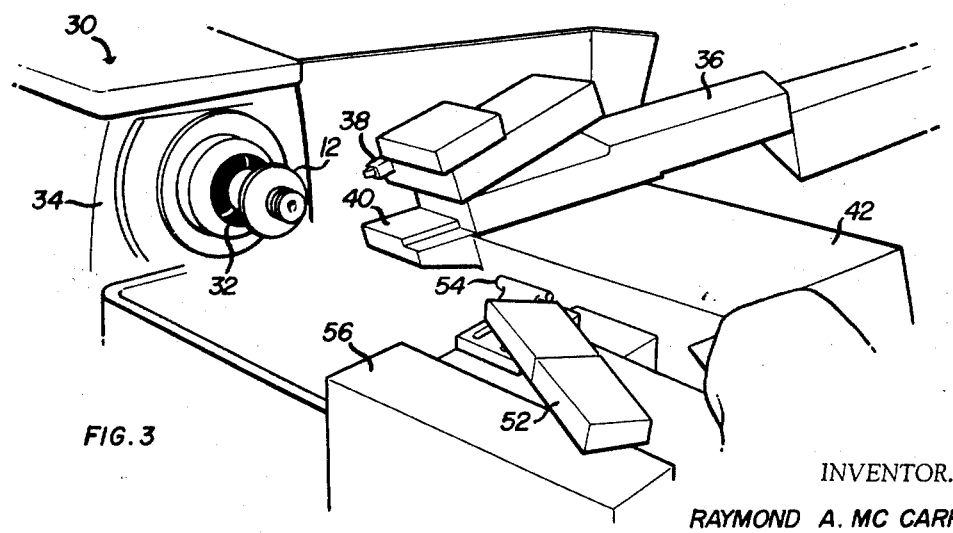
INVENTOR.
RAYMOND A. MC CARROLL
BY
WILSON, SETTLE & BATCHELDER.
ATT'YS.

June 23, 1970  R. A. McCARROLL  3,516,138
METHOD OF MACHINING A TWO PIECE PULLEY ASSEMBLY
Filed April 17, 1967  2 Sheets-Sheet 2

INVENTOR.
RAYMOND A. MC CARROLL
BY
WILSON, SETTLE & BATCHELDER.
ATT'YS.

United States Patent Office 3,516,138
Patented June 23, 1970

3,516,138
METHOD OF MACHINING A TWO PIECE PULLEY ASSEMBLY
Raymond A. McCarroll, Grosse Pointe Woods, Mich., assignor to Acme Precision Products, Inc., Detroit, Mich., a corporation of Ohio
Filed Apr. 17, 1967, Ser. No. 631,462
Int. Cl. B23b 3/28
U.S. Cl. 29—159                                           10 Claims

ABSTRACT OF THE DISCLOSURE

The disclosure provides a method of machining a workpiece having an irregular contour with circular symmetry by single point turning and single point cutting in which the workpiece rotates on a rotary support but remains in a fixed location throughout the turning and cutting steps. The method includes steps of engaging the workpiece with a turning tool, moving the turning tool along the contour of the workpiece by causing a follower means operatively connected to the turning tool to follow a template which duplicates the contour of the workpiece, thereby machining the contour to predetermined dimensions, and disengaging the turning tool from the workpiece. Thus, the contour of the workpiece is machined to predetermined dimensions by a single point or tool which moves relative to the workpiece. The method further includes steps of engaging a surface of the workpiece with a cutting tool (for threading or boring), moving the cutting tool axially of the workpiece to cut a thread or bore a hole in the workpiece as the workpiece rotates, and disengaging the cutting tool from the workpiece. Thus, threading and/or boring of the workpiece is accomplished while the workpiece remains in the same location by means of a single point or tool which moves relative to the workpiece.

BACKGROUND OF THE INVENTION

Figure 4:
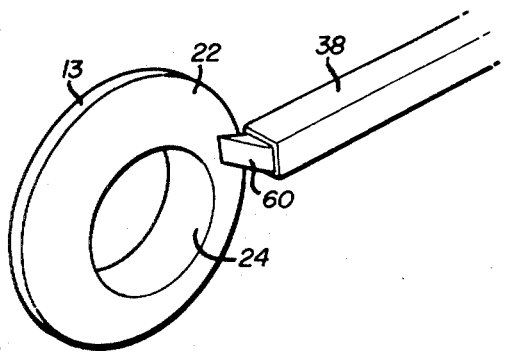

One application for the invention is in the machining of two-piece pulley assemblies in which the two pieces are screwed together to provide an adjustable pulley. One part of the pulley has a circular sheave portion and a hub concentric with the sheave having a threaded exterior cylindrical surface. The other part of the pulley assembly includes a second sheave portion with a central hole extending through it defined by a threaded interior cylindrical surface. The hub of the one part is screwed into the threaded interior surface of the other part to provide the adjustable pulley.

Prior to the present invention, the two parts for the adjustable pulley were machined in multiple station turning and threading machines in which a given support was mounted on a carriage and rotate successively to a plurality of different stations. A given surface of the pulley was machined at each station, and the threads were cut at other appropriate stations. Using a machining method and machine of this type, it was very difficult to make the threaded surfaces of the pulley parts accurately concentric and make the other surfaces of the pulley parts accurate to within desired tolerances. Each time a given part was moved to a different station, there was a chance for error in the positioning of the part which would lead to inaccuracies in the final dimensions of the part. As a result of the lack of concentricity and other dimensional variations, the two parts of the completed pulley often had too much play in the fit between them, and the pulley tended to vibrate in applications where it was rotated at high speed.

SUMMARY OF THE INVENTION

The present invention provides a machining method which leads to better dimensional control in the machining of parts for an adjustable pulley as described above, and provides better concentricity of the parts so that they screw together without undue play between the threaded surfaces. The method is also applicable to the machining of other types of workpieces. The steps of the method are outlined above in the above abstract, and it may be noted that a given part remains in a fixed location while all of the turning and cutting steps are carried out. The turning is accomplished by a single point or tool which moves along the contour of the workpiece and machines the contour to predetermined dimensions. While the workpiece remains in its fixed location, a cylindrical surface of the workpiece may be threaded by means of a single point or tool which moves axially of the workpiece. Either alternatively or additionally, a hole may be bored in the workpiece by a single tool which moves axially of the workpiece. With this single point contour turning and single point cutting of the workpiece while the workpiece remains in one location, it is possible to control dimensions quite accurately and still achieve a relatively high output rate. For even further increased productivity, the turning and cutting steps may be carried out simultaneously.

Accordingly, it is an object of the present invention to provide a machining method which results in better dimensional control over workpieces being machined than results from prior art methods such as the multiple station method referred to above.

Another object of the invention is to provide a simplified method of machining a workpiece wherein contour turning of the workpiece is accomplished by a single point or tool and cutting of the workpiece is accomplished by another single point or tool.

A further object of the invention is to provide a method of machining a workpiece wherein the workpiece remains in a fixed location throughout turnnig and cutting steps.

Another object of the invention is to provide a method of machining in which a turning tool for contour turning of a workpiece moves into engagement with the workpiece from one side of an axis about which the workpiece rotates, and in which a cutting tool for threading or boring the workpiece moves into engagement with the workpiece from the opposite side of the axis.

Other objects of this invention will appear in the following description and appended claims, reference being had to the accompanying drawings forming a part of this specification wherein like reference characters designate corresponding parts in the several views.

Figure 5:
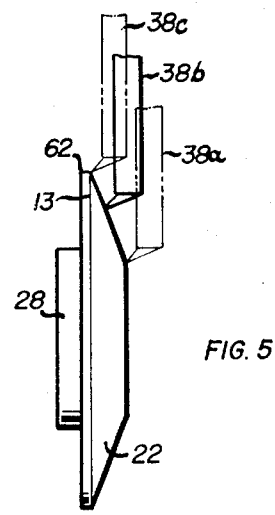
Figure 6:
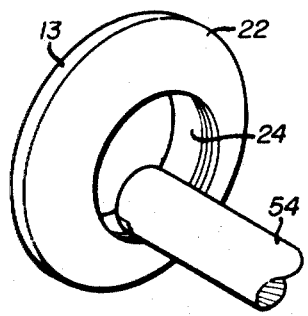
Figure 7:
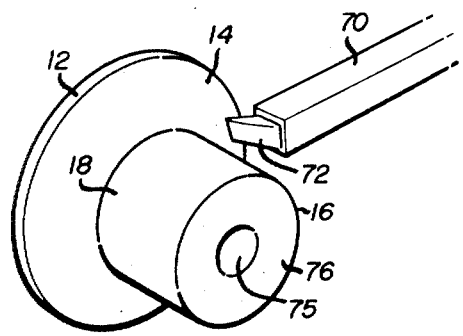
Figure 8:
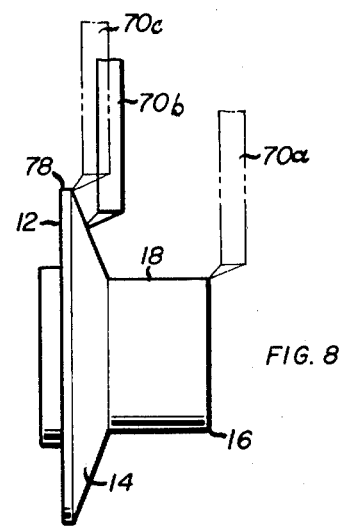
Figure 9:
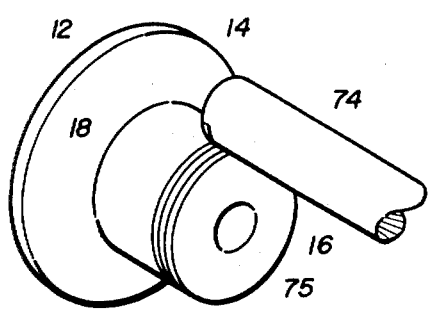

On the drawings:
FIG. 1 is an elevational view of an adjustable pulley which may be machined by the method of the invention;
FIG. 2 is a plan view of a machine which may be used to carry out the method steps of the invention;
FIG. 3 is a perspective view of the work area of the machine of FIG. 2 showing the relation of the tools and the workpiece;
FIG. 4 is a perspective view showing turning tool machining the contour of a female part of an adjustable pulley;
FIG. 5 is an elevational view of the workpiece and tool of FIG. 4 showing the path of the tool as it traverses the contour of the pulley part;
FIG. 6 is a perspective view showing a threading tool as it cuts a thread in an internal cylindrical surface of the female pulley part;
FIG. 7 is a perspective view of a male pulley part and a contour turning tool for machining the contour of the pulley part;
FIG. 8 is an elevational view of the male pulley part and a turning tool showing the path followed by the turning tool as it traverses the contour of the pulley part; and
FIG. 9 is a perspective view of the male pulley part and a threading tool which cuts a thread in an exterior cylindrical surface of the male pulley part.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the pharaseology or terminology employed herein is for the purpose of description and not of limitation.

As shown on the drawings:

In FIG. 1, an adjustable pulley 10 is shown, and the pulley includes a male pulley part 12 and a female pulley part 13 which are screwed together to provide the complete pulley assembly 10. The male pulley part 12 includes a sheave portion 14 and a hub portion 16 integral with and located centrally of the sheave portion 14. The hub portion 16 has an exterior cylindrical surface 18 which is threaded. The threads on surface 18 are interrupted by a slot 20 which is used in fastening the male and female pulley parts together. The female pulley part 13 includes a sheave portion 22, and the sheave portion 22 has a hole extending through it defined by an inner cylindrical surface 24 (see FIGS. 4 and 6) which is threaded to match the threads on cylindrical surface 18. To assemble the two pulley parts 12 and 13, the hub 16 is screwed into and through the hole in pulley part 13, and the two pulley parts are screwed together until there is a desired spacing between them. A set screw 26 is provided in a flange portion 28 of female pulley part 13, and the set screw is lined up with the slot 20 and screwed into the slot to anchor the female pulley part 13 to the hub 16 of the male pulley part 12.

The machining method of the invention has been applied successfully to the machining of pulley parts 12 and 13 to the configuration described above. However, the utility of the invention is not limited to the machining of these parts. It will be understood that the machining of the pulley parts 12 and 13 by the method of the invention is particularly advantageous.

It is also to be understood that the pulley parts 12 and 13 may be die cast to the approximate final contour desired for the parts, and the machining is carried out to turn the working surfaces of the parts to the desired final dimensions and to thread surfaces 18 and 24. FIGS. 2 and 3 illustrate parts of a machine with which the method of the invention may be carried out. Since the invention is in the method rather than in the machine, only a partial description of the machine will be given sufficient to illustrate the steps of the method of the invention.

Referring to FIGS. 2 and 3, the machine 30 includes a rotary support or chuck 32 on which the workpiece to be machined is mounted. In FIG. 2, the female pulley part 13 is shown mounted on the chuck 32, and in FIG. 3 a male pulley part 12 is shown mounted on the chuck 32. The chuck 32 is rotated by power supplied from a motor 34. It may be noted that the position of the chuck 32 is fixed and that its only motion is rotary motion about its own axis.

On the back side of the axis of the rotary chuck as viewed in FIG. 2, there is a slide assembly 36 on which a turning tool 38 is mounted. As may be seen best in FIG. 3, the slide 36 is mounted on a guideway 40 for movement toward and away from the axis of the rotary chuck 32. The guideway 40 and the slide 36 are mounted on another slide 42 which is mounted for movement axially of the rotary chuck 32 on its own guideway which is not visible in the drawings. Thus, by moving the slide 36 toward and away from the axis of the rotary chuck 32, the tool 38 may be moved radially of the workpiece 12 or 13 to follow the contour of the workpiece and to machine that contour to predetermined dimensions. By movement of the slide 42 axially of the rotary chuck 32, the tool 38 may be moved axially of the workpiece 12 or 13 so as to traverse its axial extent. By combined motion of slides 36 and 42 it is possible to make the tool 38 follow the contour of the workpiece 12 or 13.

The slide 36 is actuated so that the turning tool 38 will follow the contour of the workpiece 12 or 13 by causing a cam follower pin 44 (FIG. 2), which is connected to the slide 36 and therefore to the tool 38, to follow a template 46 which has a surface 48 duplicating the contour of the workpiece. The cam follower 44 is connected to a valve which controls the flow of hydraulic fluid into a hydraulic cylinder 50, and the hydraulic cylinder 50 in turn is connected to the slide 36. As the follower 44 moves along a template surface 48, hydraulic fluid is admitted to one side or the other side of the piston within the cylinder 50, and this fluid causes the cylinder 50 to move back and forth, thereby pushing the slide 36 back and forth, in accordance with the contour of the workpiece. The slide 42 is also actuated by a hydraulic mechanism which may be of a standard type to give the slide 42 and therefore the tool 38 a component of axial motion along the workpiece.

Mounted on the front side of the machine on the opposite side of the axis of rotary chuck 32 from the slide 36, is another slide 52 on which a cutting tool 54 is mounted. In the illustrated embodiment, the tool 54 is a threading tool, but it will be understood that where a hole is to be bored in the workpiece, the tool 54 may be a boring tool. Both threading and boring are included in the term cutting as used herein. The slide 52 is mounted on a guideway (not shown) so that the slide 52 and the tool 54 can move toward and away from the axis of the rotary chuck 32. The slide 52 is mounted on another slide 56 which is mounted for movement axially of the rotary chuck 32. Both slides 52 and 56 are mounted on a carriage 57 which can be moved axially along a track 58 so that the tool 54 may be withdrawn from the work area to the position illustrated in FIGS. 2 and 3 while the turning steps are being carried out with tool 38. After the turning operation is completed, the carriage 57 is moved along track 58 to bring the tool 54 to a position from which it can be moved by actuation of slides 52 and 56 into engagement with the workpiece 12 or 13. It is to be understood that the order in which the steps are performed is not critical. For example, the turning and cutting steps may be carried out concurrently if desired. The slides 52 and 56 are actuated hydraulically by standard hydraulic mechanisms which will not be described herein.

FIGS. 4, 5 and 6 illustrate the steps of the method of the invention as they are applied to the machining of the female pulley part 13. The point 60 of the turning tool 38 is moved into engagement with the slanting face of the sheave portion 22 of the pulley part 13, and the tool 38 is then in a position identified as 38a in FIG. 5. The turning tool 38 is moved along the slanting face of sheave portion 22 through position 38b to position 38c at the end of the slanted face in order to machine that face to the final desired dimentions. The tool 38 is then moved across the rim surface 62 of sheave portion 22 to machine that surface to its final dimensions, and the tool 38 is then disengaged from the female pulley part 13. Chamfers may be machined at the corners of part 13 if desired.

After the turning steps are completed, a threading tool 54 is moved into engagement with the cylindrical surface 24 defining the hole which extends through the female pulley part 13. The tool 54 cuts a thread in surface 24 as the female part 13 rotates on the chuck 32, and after the thread has been completely cut, the tool 54 is disengaged from surface 24 and moves back away from the pulley part 13. Again the turning and cutting steps may be carried out simultaneously if desired. Furthermore, a boring step can be carried out in addition to or instead of the threading steps if desired. FIGS. 7, 8 and 9 illustrate the steps of machining the male pulley part 12 in accordance with the invention. The point 72 of the turning tool 70 is brought into engagement with an end face 76 of the male pulley part 12 and moves radially of the pulley part to machine the end face 76 to its final dimension. The position of the tool 70 after this initial facing step is shown at 70a in FIG. 8. The tool 70 is then moved along cylindrical surface 18 of the hub 16 of the pulley part 12 to machine surface 18 to its final dimensions, and is then moved angularly up the angled face of the sheave portion 14 through position 70b to position 70c as shown in FIG. 8. The tool 70 is then moved across the rim surface 78 of the male pulley part to machine the latter surface to its final dimensions. The corners of pulley part 12 may be chamfered as part of the turning steps if desired.

After the turning steps have been completed, or at the same time the turning steps are being carried out, a threading tool 74 is brought into engagement with the cylindrical surface 18 of hub 16, and a thread is cut in surface 18 as the male pulley part 12 rotates. After the surface 18 has been threaded to the desired extent, the tool 74 is disengaged from surface 18 and moved away to its starting position. As an example of a boring step, the hole 75 could be bored through the hub 16 by the use of a boring tool attached to slide 52.

It will be noted that in the machining of the female pulley part 13 and also in the machining of the male pulley part 12, the workpiece remains at a fixed location on a rotary support 32 throughout the turning and cutting steps. The turning tool is moved into engagement with the workpiece from one side of the axis about which the workpiece rotates, and the cutting tool is moved into engagement with the workpiece from the opposite side of the axis about which the workpiece rotates. This allows for a workable arrangement of the tools in a machine as illustrated in FIGS. 2 and 3. The method is particularly well suited to the machining of symmetrical parts having an irregular contour such as exist on the male and female pulley parts described herein. However, other parts may be machined by the method of the invention if desired. It has been found that the pulley part can be machined with a high degree of accuracy to within close tolerances, and it has been particularly noted that the concentricity of the threaded surfaces of the male and female pulley parts is unusually good. This provides a close fit between the male and female pulley parts so that there will be no excessive vibration when the pulley is operated at high speeds in the machinery in which it is ultimately used.

Having thus described my invention, I claim:

1. A method of machining a workpiece having an irregular contour by a single point contour turning and progressive single point boring and/or thread cutting including the steps of mounting said workpiece on a rotary support, rotating said support and workpiece about an axis while retaining said support and workpiece in a fixed position, engaging said workpiece with a turning tool, moving said turning tool axially and/or radially of said workpiece from a normal position on one side of said axis by causing a follower means operatively connected to said turning tool to follow the contour of a template to machine a corresponding contour on said workpiece and of predetermined dimensions while said workpiece rotates, disengaging said turning tool from said workpiece, engaging a surface of said workpiece with a progressive bore and/or thread cutting tool, moving said cutting tool from a normal position on another angular location position of said axis from said turning tool axially of said workpiece while said workpiece rotates, and disengaging said cutting tool from said workpiece, said workpiece remaining mounted on said support without changing the position thereof through said turning and cutting steps.

2. The method of machining as claimed in claim 1 in which the turning and cutting steps are done simultaneously.

3. The method of machining as claimed in claim 1 in which said turning tool has a normal position located on one side of said axis and is moved from said normal position into engagement with said workpiece, and said cutting tool has a normal position located on the opposite side of said axis and is moved from the latter normal position into engagement with said workpiece.

4. The method of machining as claimed in claim 1 in which said workpiece comprises a pulley part having a circular sheave portion and a hub concentric with said sheave portion having an exterior cylindrical surface to be threaded, said turning tool following the contour of said hub and said sheave portion during the turning steps, and said cutting tool cutting a thread in said cylindrical surface during the cutting steps.

5. The method of machining as claimed in claim 1 in which said workpiece comprises a pulley part having a circular sheave portion with a hole therein defined by an interior cylindrical surface to be threaded, said turning tool following the contour of said sheave portion during the turning steps, and said cutting tool cutting a thread in said cylindrical surface during the cutting steps.

6. The method of machining as claimed in claim 1 in which said cutting tool bores a hole through said workpiece during the cutting steps.

7. A method of machining a metal workpiece having a cylindrical surface thereon extending about an axis of said workpiece and having additional surfaces thereon at least some of which extend at angles to said axis, said method including the steps of mounting said workpiece on a rotary support coaxial therewith, rotating said support and said workpiece while retaining the same in a fixed position, engaging said workpiece with a turning tool, moving said turning tool along the contour of said workpiece by causing a follower means operatively connected to said turning tool to follow a template which duplicates the desired contour of said workpiece, thereby machining said contour to predetermined dimensions, disengaging said turning tool from said workpiece, engaging said cylindrical surface of said workpiece with a cutting tool, moving said cutting tool axially of said cylindrical surface to cut a thread in said cylindrical surface as said workpiece rotates, and disengaging said cutting tool from said workpiece, said workpiece remaining mounted on said support without changing the position thereof throughout said turning and cutting steps.

8. The method of machining as claimed in claim 7 in which said workpiece comprises a metal pulley part having a circular sheave portion and a hub concentric with said sheave portion having an exterior cylindrical surface to be threaded, said turning tool following the contour of said hub and said sheave portion during the turning steps, and said cutting tool cutting a thread in said exterior cylindrical surface during the threading steps.

9. The method of machining as claimed in claim 7 in which said workpiece comprises a metal pulley part having a circular sheave portion with a hole therein defined by an interior cylindrical surface to be threaded, said turning tool following the contour of said sheave portion during the turning steps, and said cutting tool cutting a thread in said interior cylindrical surface during the threading steps.

10. A method of machining a two-piece mating pulley assembly or the like including a first metal pulley part having a circular sheave portion and a hub concentric with said sheave portion having an exterior cylindrical surface to be threaded, said pulley assembly further including a second metal pulley part having another sheave portion with a hole therein defined by an interior cylindrical surface to be threaded to receive said hub, said method including the following steps without limitation to the sequence thereof: (1) mounting said first pulley part on a rotary support with said sheave portion and said hub coaxial with said support, (2) rotating said support and said first pulley part about the axis thereof, (3) engaging said first pulley part with a turning tool, (4) moving said turning tool along the exterior contour of said rotating first pulley part by causing a follower means operatively connected to said turning tool to follow a template which duplicates the desired exterior contour of said first pulley part, thereby machining the contour of said first pulley part to predetermined dimensions, (5) disengaging said turning tool from said first pulley part, (6) engaging the exterior cylindrical surface of said first pulley part with a threading tool, (7) moving said threading tool axially of said exterior cylindrical surface to cut a thread in said exterior cylindrical surface as said first pulley part rotates, (8) disengaging said threading tool from said first pulley part, (9) removing said first pulley part from said rotary support, (10) mounting said second pulley part on said rotary support with the sheave portion and said interior cylindrical surface thereof coaxial with said support, (11) rotating said support and said second pulley part about the axis thereof, (12) engaging said second pulley part with a turning tool, (13) moving the latter turning tool along the exterior contour of said rotating second pulley part by causing a follower means operatively connected to said latter turning tool to follow a template which duplicates the desired exterior contour of said second pulley part, thereby machining the contour of said second pulley part to predetermined dimensions, (14) disengaging said latter turning tool from said second pulley part, (15) engaging said interior cylindrical surface of said second pulley part with an internal threading tool, (16) moving said internal threading tool axially of said interior cylindrical surface to cut a thread in said interior cylindrical surface as said second pulley part rotates, (17) disengaging said internal threading tool from said second pulley part, and (18) removing said second pulley part from said rotary support.

References Cited

UNITED STATES PATENTS

| | | | |
|---|---|---|---|
| 2,624,378 | 1/1953 | Di Rosa | 82—14 X |
| 2,978,939 | 4/1961 | Von Zelewsky | 82—14 |
| 3,024,684 | 3/1962 | Stratman | 82—14 |
| 3,186,269 | 6/1965 | Colebrook | 82—14 |
| 3,289,539 | 12/1966 | Sieburg | 82—14 X |
| 3,293,961 | 12/1966 | Matthias | 82—14 |

JOHN F. CAMPBELL, Primary Examiner

D. C. REILEY, Assistant Examiner

U.S. Cl. X.R.

82—5, 14; 90—13